Patented July 10, 1928.

UNITED STATES PATENT OFFICE.

GUSTAV LIEBERT, OF NUREMBERG, GERMANY, ASSIGNOR TO SÜDDEUTSCHEN TELEPHON-APPARATE-, KABEL- U. DRAHTWERKE AKTIEN GESELLSCHAFT, OF NUREMBERG, GERMANY.

METHOD OF MANUFACTURING ELECTRON-EMITTING CATHODES.

No Drawing. Application filed July 1, 1925, Serial No. 40,956, and in Germany July 24, 1924.

It is known that certain substances, more particularly the oxides of earth alkalies, emit electrons at a much lower temperature than the metals which melt at a higher temperature. For this reason the said substances are employed for the manufacture of cathodes for electric discharge vessels of any kind. The supports of the substances emitting the electrons consist of wires or metal bands which are often twisted in order to increase their strength, the electron emitting substances being coated thereon. There are various methods of coating the electron emitting substances, amongst them, the following one. The electron emitting substances are mixed in a definite proportion with hydro-carbon of high molecular weight, for instance, paraffin or colophony and the mixture thus obtained is coated on the support, consisting for instance of a platinum, or a platinum-iridium filament. Use is made either of the oxides themselves, or of a compound which passes into oxide in the presence of oxygen, at a definite temperature.

It has been found that this known method requires a refinement, in order to produce oxide coated cathode tubes, which are really uniform, as is nowadays absolutely necessary in the art of thermionic tubes. A fault that often occurs is that the cathode does not emit electrons uniformly at all the points, for which reason, for instance, in the case of amplifying thermionic tubes, the space charge is considerably increased at certain points. Moreover, it often occurs that projections and small lumps are formed in the coating at various parts of the filament, which particles become detached during the operation, thereby producing ineffective points along the filament, and thus shortening the life of the cathode. The formation of the lumps is mainly to be attributed to the fact that the suspension of the electron emitting particles in the resin is not yet sufficiently fine, which result cannot be attained with the usual method of manufacture of the oxide coated cathodes. The organic means with which the oxide is mixed is rendered fluid by heating and the electron emitting substance is placed therein in the form of powder. It will thus easily be seen that in this case, as in the case of any mixture of a fluid substance with a solid substance in the form of powder, small lumps may easily be formed. However an almost microscopic uniformity of the coating of the filament can be obtained by proceeding according to the method forming the subject matter of the present application.

The invention is based on the idea that the particles of the hydro-carbon of high-molecular weight must be mixed very intimately with the particles of the oxide in order to obtain a high uniformity and great smoothness of the cathodes.

The method according to the present invention is carried out as follows:—

The resin is powdered until it is reduced to fine dust, which in order to obtain a further fineness is passed through a hair sieve. The compound which is used for the emission is treated in exactly the same way. Thereupon the two substances are intimately mixed with one another until a very homogeneous powder is obtained. By grinding the two substances together in a mortar, the mixture can be made more intimate than by simply stirring the substances together. The powder thus obtained is then slowly heated. The melting of the hydro-carbon causes a very homogeneous mixture between the resin and the oxide to be obtained whilst the formation of lumps is completely avoided.

The sieve used for sifting is preferably of such a mesh, that only those particles which have a diameter smaller than 1/20 mm. can pass through. In order further to improve the result it is desired to attain, the oxide is allowed to settle down, under very slow cooling, and only the uppermost portion is employed for coating the cathode.

What I claim is:—

1. A method of manufacturing electron emitting cathodes consisting in first intimately mixing an electron emitting substance with a carbon compound of high molecular weight, both in a finely pulverized form, then heating and fusing them together, and finally coating the cathode with the substance thus produced.

2. A method of manufacturing cathodes according to claim 1, and in which the electron emitting substance and the carbon compound are passed through a sieve before they are fused together, so that only particles smaller than 0.05 mm. diameter are employed.

3. A method of manufacturing cathodes according to claim 1, and in which after the electron emitting substance and the carbon compound have been fused together, the mass thus obtained is cooled slowly, only the upper portion thereof being used for the coating of the cathode.

In testimony whereof I hereunto affix my signature.

GUSTAV LIEBERT.